(12) United States Patent
Stampoultzis

(10) Patent No.: US 7,543,551 B2
(45) Date of Patent: Jun. 9, 2009

(54) ANIMAL VISOR

(76) Inventor: Anastasios Stampoultzis, RMB NZ1 Navigators Road, Ballarat (AU) 3352

( * ) Notice: Subject to any disclaimer, the term of this patent is extended or adjusted under 35 U.S.C. 154(b) by 0 days.

(21) Appl. No.: 12/032,994

(22) Filed: Feb. 18, 2008

(65) Prior Publication Data

US 2008/0121193 A1 May 29, 2008

(51) Int. Cl.
*A01K 13/00* (2006.01)
(52) U.S. Cl. ...................................... 119/850
(58) Field of Classification Search ............... 119/850; 54/80.1
See application file for complete search history.

(56) References Cited

U.S. PATENT DOCUMENTS

| | | | | |
|---|---|---|---|---|
| 2,320,214 A | * | 5/1943 | Bowers | 2/8.1 |
| 3,924,388 A | | 12/1975 | Morrison | 54/80 |
| 4,040,239 A | * | 8/1977 | Powell | 54/80.1 |
| 5,321,937 A | * | 6/1994 | Hamilton | 54/80.2 |
| 5,785,009 A | | 7/1998 | Nease | 119/850 |
| 6,050,068 A | | 4/2000 | White, Jr. | 54/80.2 |
| 6,128,891 A | * | 10/2000 | McMahon | 54/80.1 |

* cited by examiner

*Primary Examiner*—Michael R Mansen
*Assistant Examiner*—Monica L Williams
(74) *Attorney, Agent, or Firm*—Baker & McKenzie LLP; David I. Roche

(57) ABSTRACT

A protective enclosure, such as a visor, for use on a dog (or other animal) comprising a body foldable into the general shape of the animal's head, wherein the body includes an upper portion adapted to fold around the animal's snout so as to form a front opening for the animal's mouth and nostrils, and a rear portion adapted to be foldable over the rear of the animal's head so as to form one or more ear openings, and wherein said body includes a compliant internal spacer adapted to hold the enclosure snugly in engagement with the animal's head when applied to the animal.

23 Claims, 4 Drawing Sheets

ANIMAL VISOR

CROSS-REFERENCE TO RELATED APPLICATIONS

The present application claims priority from Australian Provisional Patent Application No. 2005906512 filed on 23 Nov. 2005 and Australian Provisional Patent Application No 2006901835 filed on 7 Apr. 2006, the content of which is incorporated herein by reference.

INTRODUCTION TO THE INVENTION

This invention relates to protective devices for use in animal veterinary and other situations where an animal's head region and in particular an animal's eyes, require physical protection to limit or impede the ability of an animal to scratch or interfere with its eyes that may be sensitive or recuperating from a medical condition or veterinary treatment.

BACKGROUND TO INVENTION

Animals undergoing post operative recuperation and/or treatment for eye problems frequently require eye protection during the post operative or post treatment stages in order to allow the animals eyes to fully recover and to prevent the tendency for an animal to interfere with its eyes due to itchiness or other irritations that may be present after treatment.

In order to provide such protection, various devices are currently available including goggles of the type worn by people and enlarged collars. Goggles are difficult to apply to a dogs face and often provide more irritation and distraction to the dog than the eye problems per se. An alternative device is the Elizabethan type collar or cone which is a bucket shaped device adapted for placing around a dogs neck in an endeavour to prevent the dog from scratching or interfering with its face or eyes. Whilst these devices are relatively effective, they are difficult to properly fit to an animal, they are clumsy and awkward for the animal and often can make it extremely difficult for the animal to eat or drink or even sleep not to mention the difficulty an animal will face negotiating obstacles travelling through doorways and navigating its way around in the usual manner.

It will be highly desirable to provide a wearable visor or protective device adapted to comfortably fit to a dogs head in a secure manner so as to protect the dog or animals eyes whilst not interfering with most other activities that the animal normally enjoys.

One object of the invention is to provide an improved animal visor.

STATEMENTS OF INVENTION

In one aspect the invention provides a protective visor for use on a dog or other animal comprising a body formable to the general shape of said animals head wherein said body includes an upper portion adapted to fold around said animals snout so as to form a front opening for said animals mouth and nostrils and a rear portion adapted to fold over the rear of said animals head so as to form two ear openings wherein said body includes a pliant internal pressure strap adapted to hold said visor snugly in engagement with said animals head when fitted thereto.

The pressure strap may be formed as an extension of the rear portion of said body and adapted to be folded into the internal cavity of said visor and fitted to said upper portion of said body.

The visor body may include a plurality of straps extending from the upper and rear portions thereof and adapted for fitting to corresponding parts of said body so as to define the visors shape and openings. The body is most preferably made of a pliant and visually transparent material. The body may include necessary slots or other fastening means adapted to receive said straps. The body may be provided in a flat form which is conformable and fitted to said animals head by drawing said straps around the animals snout and ears and fitting the free end of the straps to the corresponding part of the body.

The pressure strap may be provided with a longitudinal slot to enhance the snug engagement to an animals head including accommodating any occipital bones of prominence.

The pressure strap may be configured to apply sufficient pressure to ensure the visor sits snugly on the animals head whilst remaining comfortable and also providing an internal air gap between the animals head and the upper portion of the visor.

The visor may also be provided with one or a plurality of collar straps to assist fitting by accommodating or separate collar worn by the animal. The upper portion of the body may be provided with score lines to assist in adjusting the length of the visor.

The upper portion may also be provided with optional ventilation holes.

DETAILED DESCRIPTION OF THE INVENTION

The invention will now be described with reference to the following figures.

LEGEND

1. Body
2. Upper Portion
3. Front Opening
4. Rear Portion
5. Ear Opening
6. Pressure Strap
7. Slot
8. Chin Strap
9. Ear Strap
10. Collar Strap
11. Receiving Slot/Buckle
12. Tab
13. Score Lines (Optional)
14. Vents (Optional)

Figure 1:
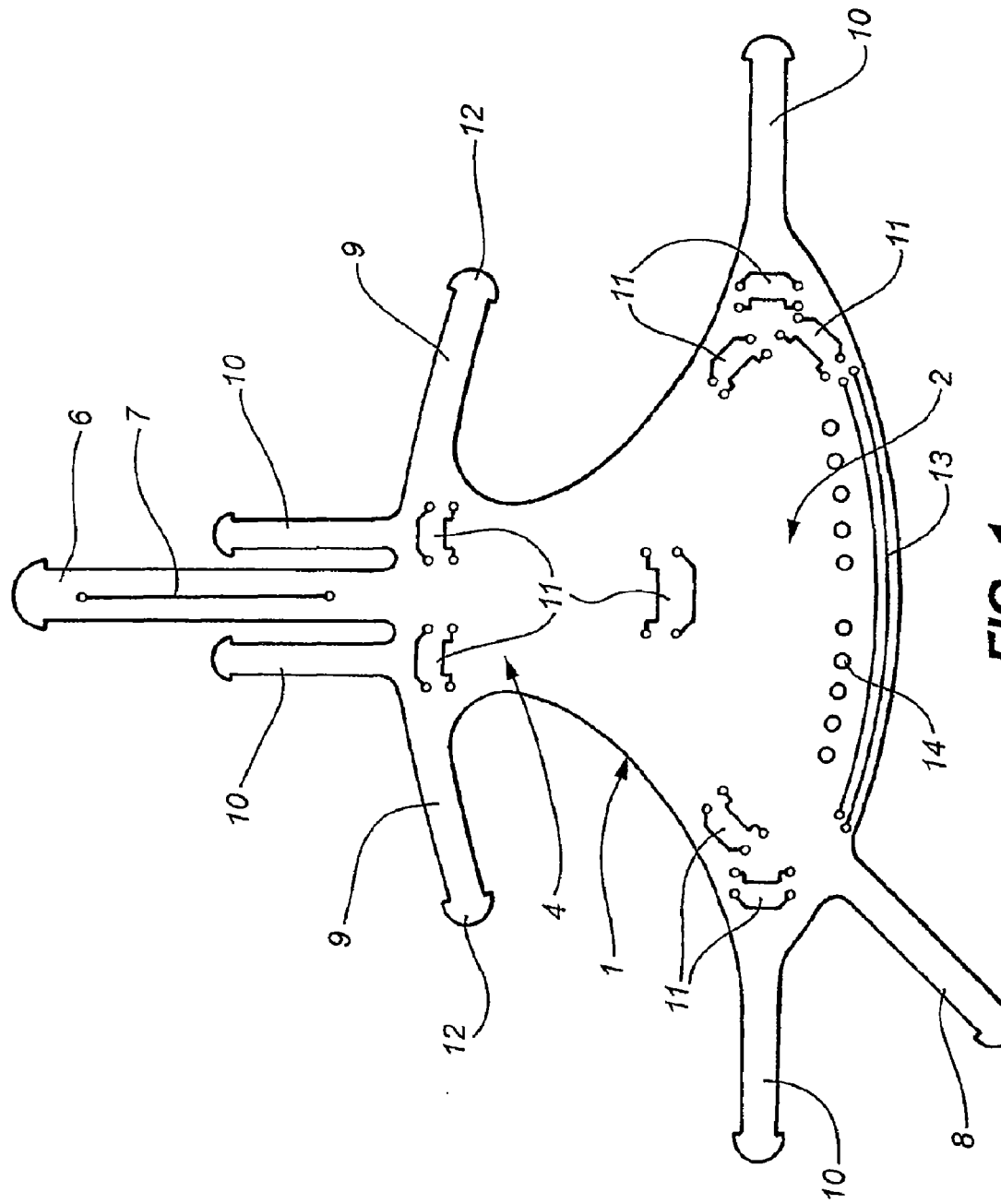
FIG. 1 shows a plan view of the template of the protective visor.
Figure 2:
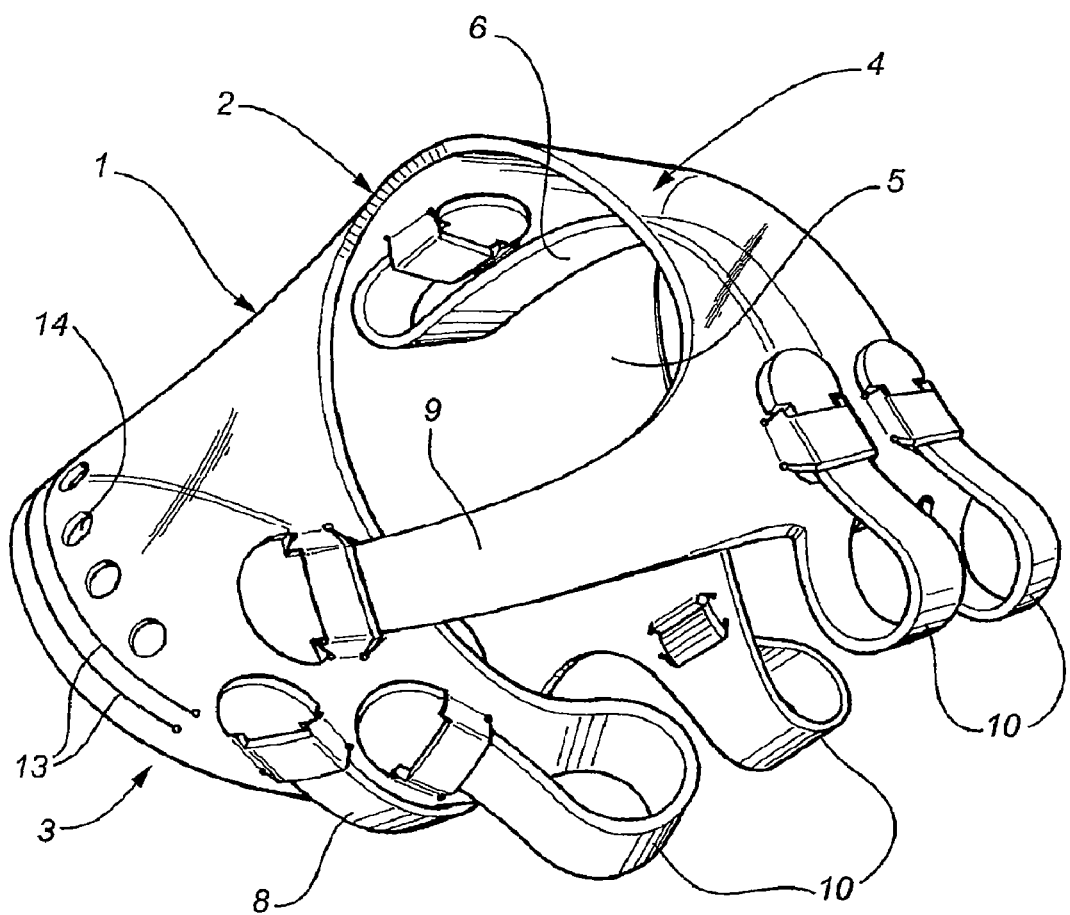
FIG. 2 shows a perspective view from the rear of the assembled protective visor.

Referring firstly to FIGS. 1 and 2, the invention provides a protective visor particularly adapted for use and wearing by an animal, for example a dog. The protective visor can be made up of one piece template cut out of pliant transparent materials including soft polyvinylchloride sheeting of a thickness sufficient to provide adequate protection without unnecessary weight or bulk. The protective visor comprises a body 1 which is adapted to be shaped and conformed to the general shape of an animals head. The body region comprises an upper portion 2 adapted to sit on top of the dogs head and fold around the dogs snout where the action of fitting the visor to an animal draws the upper portion over the dogs head and around either side of the dogs snout so as to form a front opening 3 through which the dogs nostrils and mouth can readily protrude. The visor body further includes a rear portion 4 which is adapted to fold over the rear or back of the animals head behind the animals ears and when drawn back forms two ear openings 5 through which the animals ears can comfortably protrude. The body of the visor further comprises a pressure strap 6 which can optionally be formed as an extension of the rear portion 4 with the pressure strap 6 adapted for folding within the internal space of the shaped visor and fitted to the upper portion 2 of the body. The visor body also includes a plurality of outwardly extending straps which extend from the upper and rear portions of the visor body and are adapted for fitting to corresponding and carefully positioned parts of the visor body such that when the visor is fitted to an animal and the straps drawn around the animals head, the visor of the invention is configured so as to fit to the animals head and to provide the front opening 3 and the ear openings 5.

The visor body is preferably provided in a flat form being easily fitted to an animal by drawing the straps extending from the visor body around the animals snout and ears and fitting the free ends of the straps to the corresponding parts of the visor body. The straps may include a chin strap 8 which, when drawn underneath the animals chin and fitted to the appropriate receiving slot 11 or buckle, causes the upper portion of the visor to fold around the animals snout comfortably leaving the front opening 3. The body may be further provided with ear straps 9 extending from the rear portion of the body such that the ear straps can allow the rear portion 4 to be drawn back over the back of the animals head, underneath the animals ears and fitted to corresponding receiving slots 11 or buckles to the upper portion 2 of the body 1.

Figure 3:
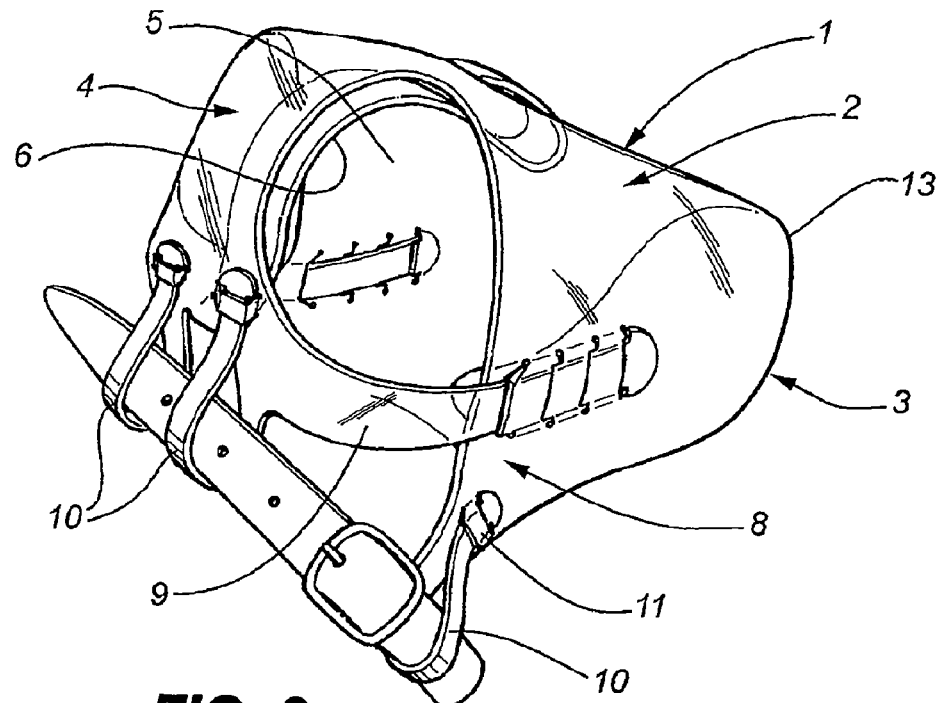
FIG. 3 shows a perspective view of the protective visor fitted to an animals collar.

The internal pressure strap 6 may be provided with a longitudinal slot 7 such that the pressure strap, when brought to bear down on the top of an animals head, is provided with sufficient pliancy and lateral flexibility so as to neatly sit on the top of a dogs skull traversing or accommodating any occipital bones of prominence that might occur in an animals skull, of the like found for example, in beagles. In this manner, the pressure strap 6 is able to provide a gentle and conforming pressure for the visor so as to ensure it fits snugly on a dogs head without wobbling or moving sideways or backwards and forwards. A further advantage of the pressure strap is the provision of an air gap between the upper portion of the visor and the top of the dogs or animals skull as can be seen in FIGS. 3 and 4.

The visor may also be provided with a plurality of collar straps 10 which provide additional anchoring means for the visor which can be further supported on a dogs head by passing the collar straps around the collar worn by the dog or animal.

In order to provide full flexibility for use in a range of animals, the upper portion of the visor body may be optionally provided with a plurality of score lines 13 which allow the length of the upper portion of the visor to be adjusted to fit into animals having long or shorter snouts. The visor upper portion may also optionally be provided with a plurality of vent holes 14 to assist in ventilation, if required.

Figure 4:
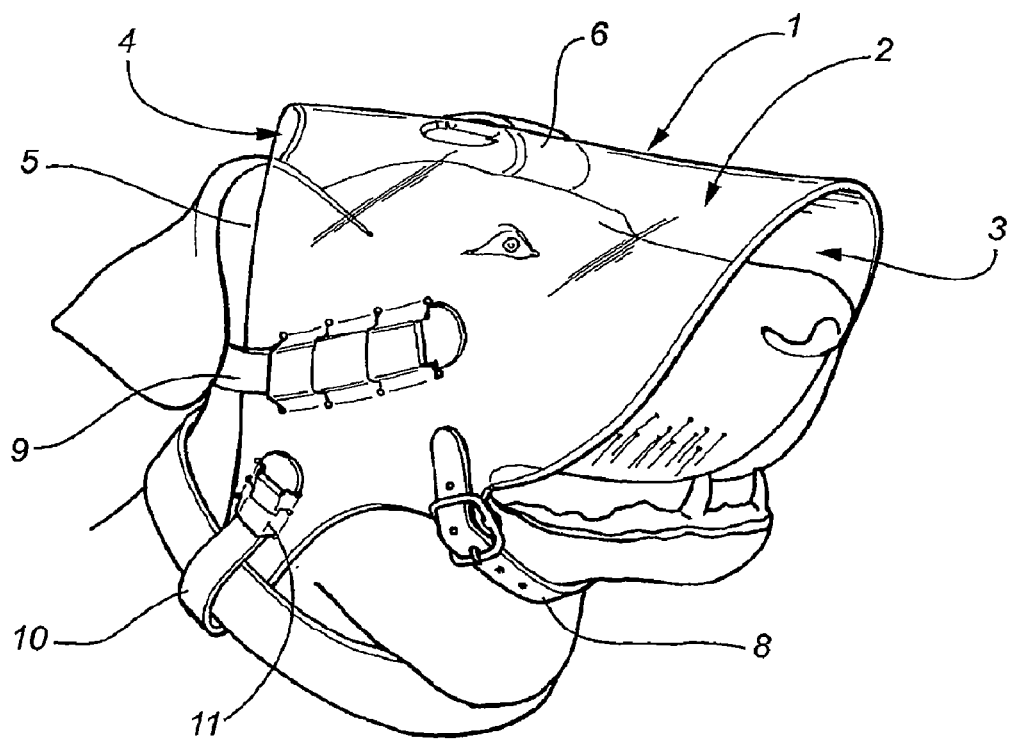
FIG. 4 shows a perspective view of the animal visor as fitted to a dog.
Figure 5:
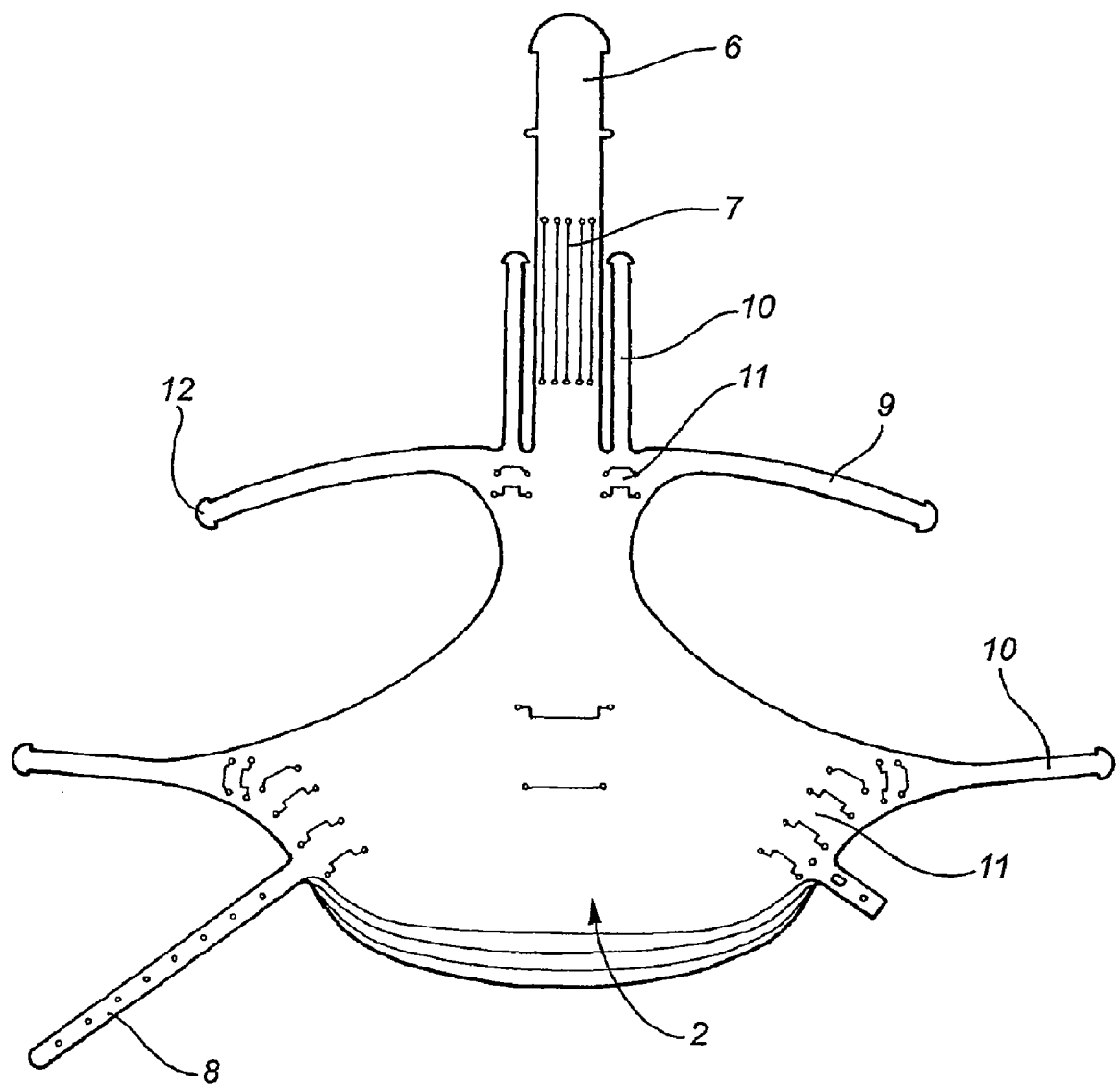
FIG. 5 shows a plan view of a generic visor template.

Referring now to FIG. 4 the visor of the invention is applied to a dog by sitting the flat visor as shown in FIG. 1 on top of the dogs head once a visor of appropriate size has been selected. The pressure strap 6 is then fitted to the receiving slots formed on the upper portion 2 of the body 1 and the visor can then be gently pushed down onto the top of an animals head. The chin strap 8 is then drawn underneath the animals lower jaw and fastened to the opposing side of the upper portion so as to draw the body into the general shape of the dogs head, across the top of the dogs snout so as to provide the front opening 3 through which the dog or animal can readily breathe and eat. The ear straps 9 are then pulled down so as to draw the rear portion of the body 1 over the back of a dogs head with the ear straps 9 being drawn underneath the dogs ear and fitted into the appropriate receiving slots or buckles on the upper portion of the body. Once the chin and ear straps are fitted to the appropriate tightness, the collar straps can then be drawn around and the dogs collar fitted through the collar straps so as to gently, but snugly, fit the visor of the invention to the dogs head. The pressure strap 6 ensures that the visor does not move around in an uncontrolled fashion; but, remains comfortably on the dogs head allowing pliancy and movement as the dog opens and closes its jaw and also provides accompanying ear gap between the upper portion of the visor and the top of the dogs head.

In another embodiment of the visor of the invention, the visor as shown in FIG. 1 can be preformed and assembled to the form shown in FIG. 2, prior to fitting to an animal or a dog. When the visor has been preassembled in accordance with the approximate anatomical requirements of the animal, the visor can be easily slid over the dogs head with the dogs snout being gently inserted into the visor and the visor snugly placed onto the dogs head by drawing the dogs ear through the ear opening 5. The only requirement then is for the dog's collar to be passed through the collar straps 10 and the visor is then snugly fitted to an animal. This process can be used and if the visor is found to require adjustment, for example if the visor is too loose it can be withdrawn from the dog's head and adjusted with ease away from the animal and refitted until a perfect fitting configuration is established.

Once the visor of the invention is fitted to a dog its visual transparency and soft pliant texture render the visor virtually unnoticeable by the dog. In a short time the visor almost becomes part of the dogs head and face with the dog becoming rapidly adjusted and almost unaware of the presence of the visor. The visor provides uninterrupted visual comfort to the dog whilst preventing the dog from interfering with its eyes and maximising recuperation from any eye infections or eye surgery.

The particular shape and configuration of the visor can be readily adjusted to fit a wide range of animals whilst falling within the scope of the current invention. The particular embodiment detailed above relates to a dog but many variations of the invention fall within the scope of the current application.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A protective visor for use on a dog or other animal comprising a body formable to the general shape of said animal's head wherein said body includes an upper portion adapted to fold around said animals snout so as to form a front opening for said animal's mouth and nostrils and a rear portion adapted to fold over the rear of said animal's head so as to form two ear openings, wherein said body includes a pliant internal pressure strap adapted to hold said visor snugly in engagement with a animal's head when fitted thereto, said internal pressure strap extending from the upper portion of said body so as to gently bear down on the animal's head when fitted to said animal and gently lift the visor away from the animal's snout, said internal pressure strap being formed as an extension of the rear portion of said visor body and adapted to be folded under the rear portion of said visor and connected to the upper portion of said visor body.

2. A visor according to claims 1, wherein said pressure strap includes a plurality of longitudinal slots to enhance the pliancy of said pressure strap to said animal's head.

3. A visor according to claim 2, wherein said longitudinal slots are positioned to generally correspond with the occipital bones of prominence of the animal's head.

4. A visor according to claim 1, further including a plurality of straps extending from the upper and rear portions thereof and adapted for connection to corresponding parts of said body so as to define a three dimensional shape of said visor.

5. A visor according to claim 4, wherein said straps include a chin strap, ear straps and a plurality of collar straps.

6. A visor according to claim 1, wherein said body is made of a pliant and visually transparent material.

7. A visor according to claim 6, wherein said material is polyvinyl chloride.

8. A visor according to claim 1, wherein the body and straps are cut from a sheet and vents are formed in the body.

9. A visor according to claim 1, wherein the body includes indicia to facilitate varying the length of said body to accommodate animals of different sizes.

10. A blank for forming a protective enclosure for use on the head of an animal, said blank comprising a body comprising a generally flat plastic sheet and foldable into the general shape of said animal's head, said body including an upper portion foldable around said head so as to form a front opening for said animal's mouth and nostrils and a rear portion engageable with a rear of said animal's head so as to be capable of forming two openings through which said animal's ears may extend, said body including a spacer extending from the rear portion of said body and foldable to a position adjacent to the front portion of said body to create a gap between the body and the wearer at the upper portion of said body.

11. A blank according to claim 10, wherein said spacer is an internal pressure strap extending from the upper portion of said body foldable to a position adjacent to the animal's head when fitted to said animal and adapted to lift the visor away from a animal's snout.

12. A blank according to claim 11, wherein said internal pressure strap is formed as an extension of the rear portion of said visor body and adapted to be folded under the rear portion of said visor and connected to the upper portion of said visor body.

13. A blank according to claim 11, wherein said pressure strap includes at least one slot to enhance the pliancy of said pressure strap to said animal's head.

14. A blank according to claim 13, wherein said slot is longitudinal and positioned to generally correspond with an occipital bones of prominence of the animal's head.

15. A blank according to claim 10, further including a plurality of straps extending from the upper and rear portions thereof and adapted for connection to corresponding parts of said body so as to retain said body in a three dimensional shape.

16. A blank according to claim 15, wherein said straps include a chin strap, ear straps and a plurality of collar straps.

17. A blank according to claim 10, wherein said body is made of a pliant and generally transparent material.

18. A protective enclosure for use on the head of an animal, said enclosure comprising a body formable to the general shape of said animal's head, said body including an upper portion foldable around said head so as to form a front opening for said animal's mouth and nostrils and a rear portion engageable with a rear of said animal's head so as to form at least one opening through which said animal's ears may extend, said body including a spacer monolithically formed with said body and foldable to a position whereby said spacer lifts the visor away from a wearer and creates a gap between the body and the wearer at a an upper side of said enclosure, said enclosure including at least one strap extending from the body and adapted for connection to parts of said body so as to retain said body to said animal, said body being made of a pliant and generally transparent material.

19. A protective visor according to claim 18, wherein further including a plurality of straps extending from the upper and rear portions thereof and adapted for connection to corresponding parts of said body so as to retain said body in a three dimensional shape.

20. A protective visor according to claim 19, wherein said straps include a chin strap, ear straps and a plurality of collar straps.

21. A protective enclosure for use on the head of an animal, said enclosure comprising a body formable to the general shape of said animal's head, said body including an upper portion foldable around said head so as to form a front opening for said animal's mouth and nostrils and a rear portion engageable with a rear of said animal's head so as to form at least one opening through which said animal's ears may extend, said body including a spacer unitary and formed in one piece with said body and foldable to a position whereby said spacer lifts the visor away from a wearer and creates a gap between the body and the wearer at an upper side of said enclosure, said enclosure including at least one strap extending from the body and adapted for connection to parts of said body so as to retain said body to said animal, said body being made of a pliant and generally transparent material.

22. A protective visor according to claim 21, wherein further including a plurality of straps extending from the upper and rear portions thereof and adapted for connection to corresponding parts of said body so as to retain said body in a three dimensional shape.

23. A protective visor according to claim 22, wherein said straps include a chin strap, ear straps and a plurality of collar straps.

* * * * *

UNITED STATES PATENT AND TRADEMARK OFFICE
CERTIFICATE OF CORRECTION

| | | |
|---|---|---|
| PATENT NO. | : 7,543,551 B2 | Page 1 of 1 |
| APPLICATION NO. | : 12/032994 | |
| DATED | : June 9, 2009 | |
| INVENTOR(S) | : Anastasios Stampoultzis | |

It is certified that error appears in the above-identified patent and that said Letters Patent is hereby corrected as shown below:

Col. 1, line 5,
Add as the first sentence of the specification, the following: "This is a continuation of PCT Application No. PCT/AU06/001679 filed 10 NOV 2006."

Signed and Sealed this

Fourth Day of August, 2009

JOHN DOLL
*Acting Director of the United States Patent and Trademark Office*